(12) United States Patent
Heather

(10) Patent No.: US 9,565,807 B2
(45) Date of Patent: *Feb. 14, 2017

(54) MODULAR LIVING WALL SYSTEM

(71) Applicant: VeraWall, LLC, Portland, OR (US)

(72) Inventor: Brian Heather, Portland, OR (US)

(73) Assignee: VeraWall, LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,858

(22) Filed: Mar. 25, 2015

(65) Prior Publication Data

US 2015/0195997 A1    Jul. 16, 2015

Related U.S. Application Data

(63) Continuation of application No. 13/604,999, filed on Sep. 6, 2012, now Pat. No. 9,015,991.

(60) Provisional application No. 61/531,535, filed on Sep. 6, 2011.

(51) Int. Cl.
  *A01G 9/02*  (2006.01)
  *A01G 9/24*  (2006.01)

(52) U.S. Cl.
  CPC .............. *A01G 9/025* (2013.01); *A01G 9/246* (2013.01); *Y02P 60/244* (2015.11)

(58) Field of Classification Search
  CPC ... A01G 9/022; A01G 9/025; A01G 2031/003
  USPC .......... 47/47, 65.7–65.9, 66.1, 62 R, 63, 82, 83, 47/86
  See application file for complete search history.

(56) References Cited

U.S. PATENT DOCUMENTS

| | | | |
|---|---|---|---|
| 5,242,052 A | 9/1993 | Weder | |
| 7,627,983 B1 | 12/2009 | Deutsch-Aboulmahassine | |
| 7,788,848 B1 * | 9/2010 | Koumoudis | A01G 9/025 47/65.9 |
| 7,832,144 B2 * | 11/2010 | Corradi | A01G 31/02 47/59 S |
| 7,926,224 B1 | 4/2011 | Koumoudis | |
| 8,122,642 B1 * | 2/2012 | Huberman | A01G 31/001 47/59 S |
| 8,141,294 B2 | 3/2012 | Bribach et al. | |
| 8,516,743 B1 * | 8/2013 | Giacomantonio | A01G 9/022 47/62 A |
| 8,950,112 B2 * | 2/2015 | dos Santos | A01G 9/025 47/82 |
| 2008/0000153 A1 * | 1/2008 | Sugiyama | A01G 9/025 47/47 |

(Continued)

FOREIGN PATENT DOCUMENTS

| | | | | |
|---|---|---|---|---|
| DE | 3635463 A1 * | 4/1988 | | A47H 27/00 |
| FR | 2924896 A1 | 6/2009 | | |
| WO | WO 2006073001 A1 * | 7/2006 | | A01G 9/025 |

*Primary Examiner* — Danielle Clerkley
(74) *Attorney, Agent, or Firm* — Schwabe, Williamson & Wyatt, P.C.

(57) ABSTRACT

Embodiments include but are not limited to modular living wall systems. A module of a modular living wall system may include a frame including a plurality of rails, each rail coupled to another rail by their respective ends, and a fabric arrangement mounted onto the frame and including a first fabric and a second fabric overlaying the first fabric, wherein the first fabric is a hydrophilic mat, and wherein the second fabric includes at least one opening exposing the first fabric and configured to receive a plant. The living wall system includes integrated irrigation. Other embodiments may be described and/or claimed.

21 Claims, 19 Drawing Sheets

(56) References Cited

U.S. PATENT DOCUMENTS

| | | |
|---|---|---|
| 2009/0223126 A1 | 9/2009 | Garner et al. |
| 2011/0059518 A1 | 3/2011 | Bribach et al. |
| 2011/0088319 A1 | 4/2011 | Koumoudis |
| 2011/0093122 A1 | 4/2011 | Koumoudis |
| 2011/0107667 A1* | 5/2011 | Laurence ............... A01G 9/025 47/59 S |
| 2011/0146150 A1 | 6/2011 | Lyon |
| 2011/0154744 A1 | 6/2011 | Bowen |
| 2011/0215937 A1 | 9/2011 | Carroll et al. |
| 2011/0225883 A1* | 9/2011 | Clifford ................ A01G 1/007 47/82 |
| 2011/0302837 A1* | 12/2011 | Chen ..................... B32B 5/022 47/65.8 |
| 2012/0066972 A1* | 3/2012 | Lin ....................... A01G 9/024 47/82 |

* cited by examiner

Metal Support Frame to Rail Perspective (2 panel section)

Metal Support Frame to Rail with Clip and Basin

MODULAR LIVING WALL SYSTEM

CROSS REFERENCE TO RELATED APPLICATIONS

The present application is a continuation of U.S. patent application Ser. No. 13/604,999, filed Sep. 6, 2012, and claims priority to U.S. Provisional Patent Application No. 61/531,535, filed Sep. 6, 2011, the entire specifications of which are hereby incorporated by reference in their entirety for all purposes.

TECHNICAL FIELD

Embodiments of the present invention relate generally to living walls and more particularly to a modular living wall system including an integrated irrigation network.

BACKGROUND

Living walls, also known as biowalls or green walls, may allow for plants to be incorporated into a vertical structure such as a wall. While traditional structures, such as trellises and arbors, may provide a vertical means for growing certain limited varieties of climbing plants, these structures typically require weeks, months, or longer for the structures to be covered by vegetation.

More recent vertical planting structures may provide for bags, ledges, or hanging plant pots to be distributed onto a structure for receiving plants and soil or other planting medium. The frame of the structure is typically a cumbersome singular structure made of plywood, plastic, or another material, and the plants are either naturally watered by rain or is manually watered. While these structures may be suitable for some applications, it is known that hanging bags tend to tear or otherwise deteriorate from due to the weight of the plant, soil, and water, or from the growth of the root structure of the plants. The known containers may also provide limited space in which the plant roots can grow, which may impact the health of the plants. Moreover, unless the structure is manually watered on a regular basis, there may be some areas that are wetter or drier than others, which may lead to algae or mold in some areas or under-watered plants in other areas.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent. Moreover, some embodiments may include more or fewer operations than may be described.

The description may use the phrases "in an embodiment," "in embodiments," "in some embodiments," or "in various embodiments," which may each refer to one or more of the same or different embodiments. Furthermore, the terms "comprising," "including," "having," and the like, as used with respect to embodiments of the present invention, are synonymous.

The term "coupled to," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled to each other.

For the purposes of the present invention, the phrase "A/B" means A or B. The phrase "A and/or B" means "(A), (B), or (A and B)." The phrase "at least one of A, B, and C" means "(A), (B), (C), (A and B), (A and C), (B and C), or (A, B and C)." The phrase "(A)B" means "(B) or (AB)," that is, A is an optional element.

Various embodiments of the present invention are directed to a modular living wall system including an integrated irrigation network.

Figure 1:
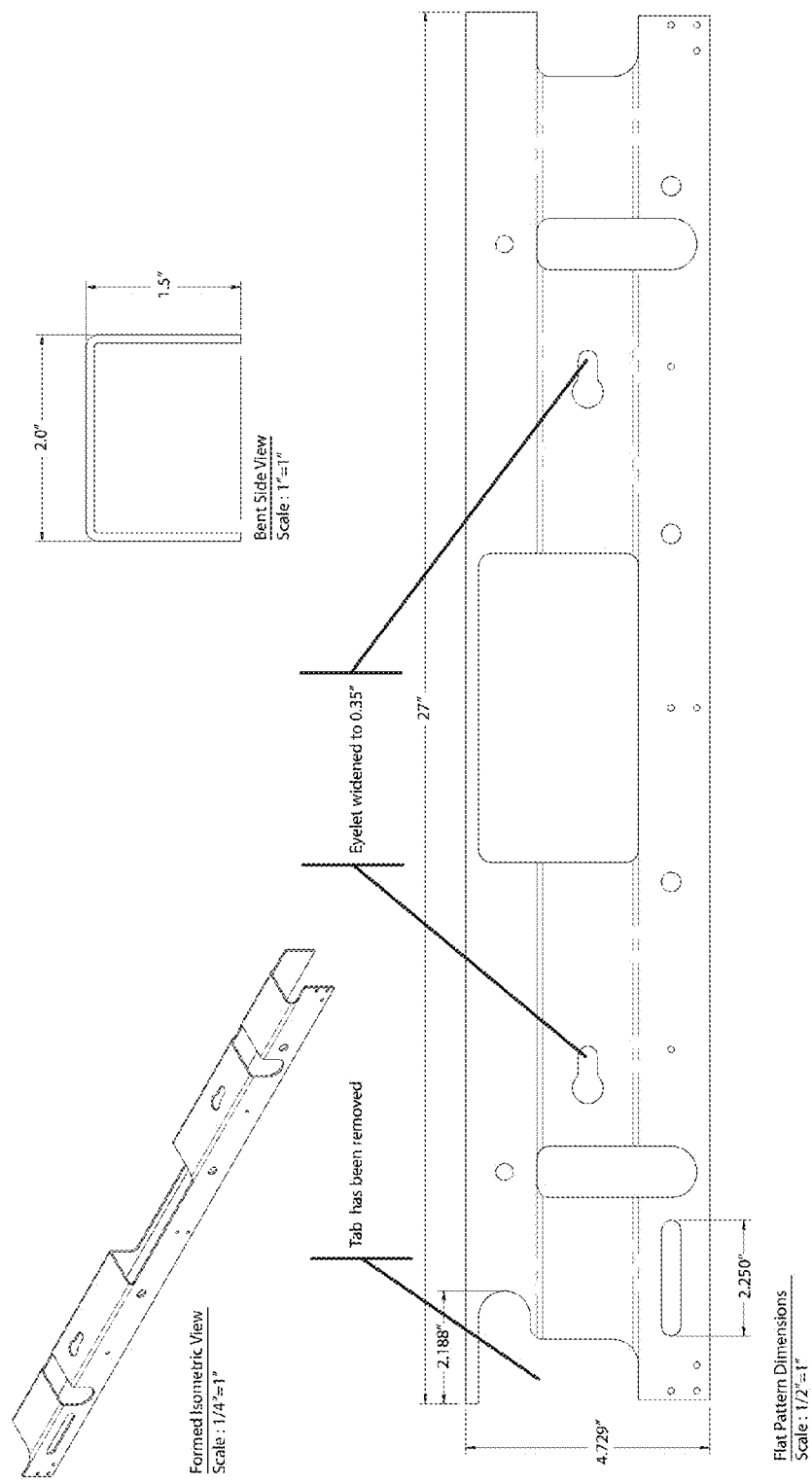
FIG. 1 illustrates an example top clip or rail of a frame of a module of a modular living wall system, in accordance with various embodiments of the present invention.
Figure 2:
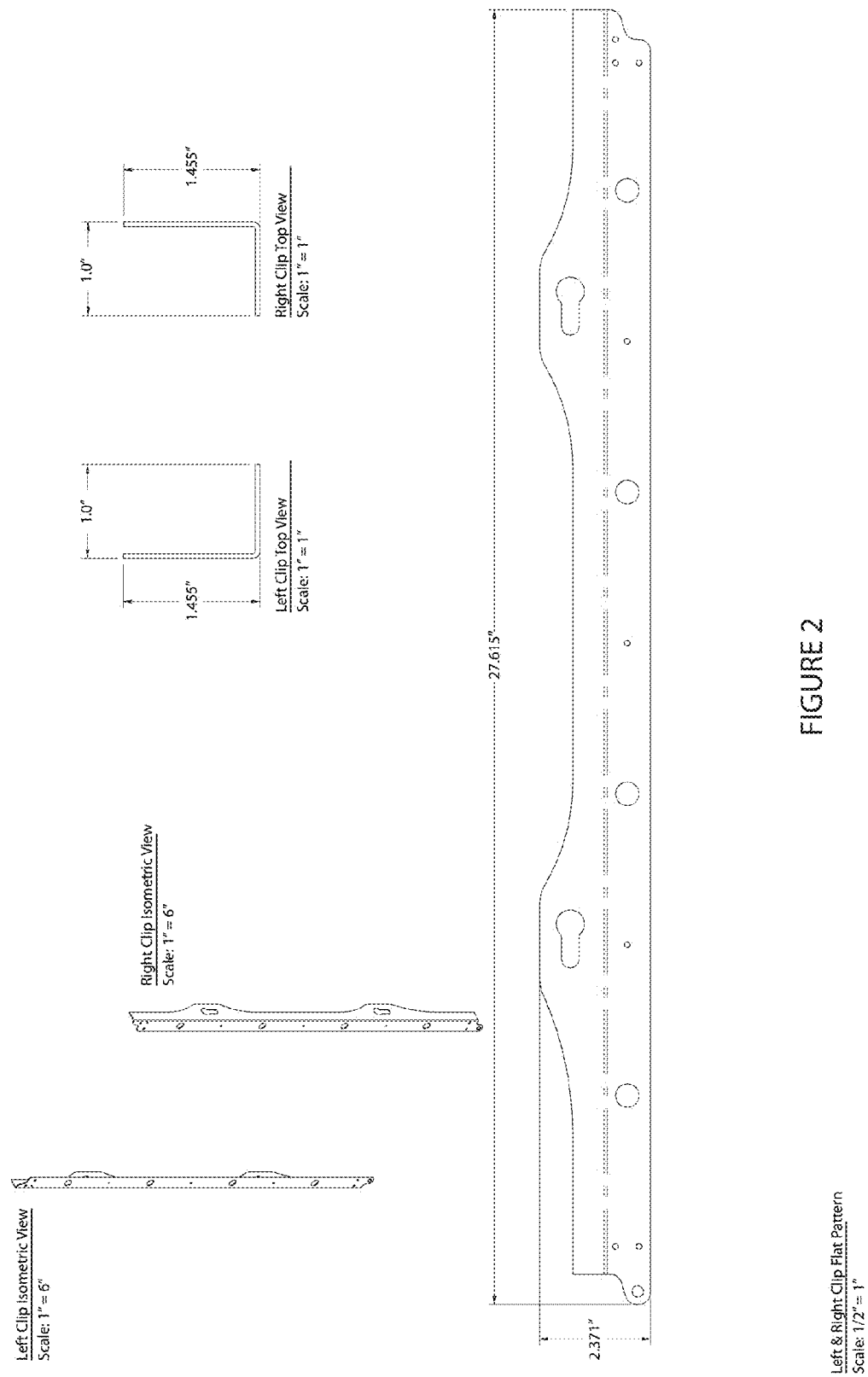
FIG. 2 illustrates an example left clip or rail and an example right clip or rail of a frame of a module of a modular living wall system, in accordance with various embodiments of the present invention.
Figure 3:
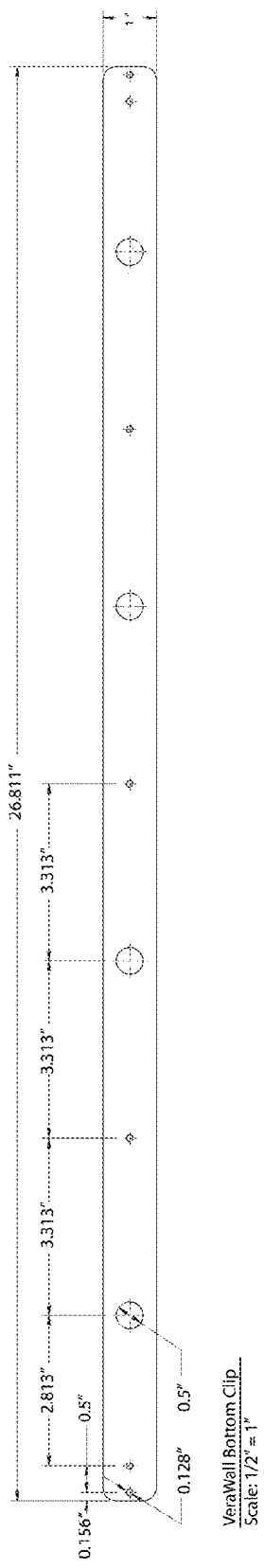
FIG. 3 illustrates an example bottom clip or rail and an example middle clip or rail of a frame of a module of a modular living wall system, in accordance with various embodiments of the present invention.
Figure 3:
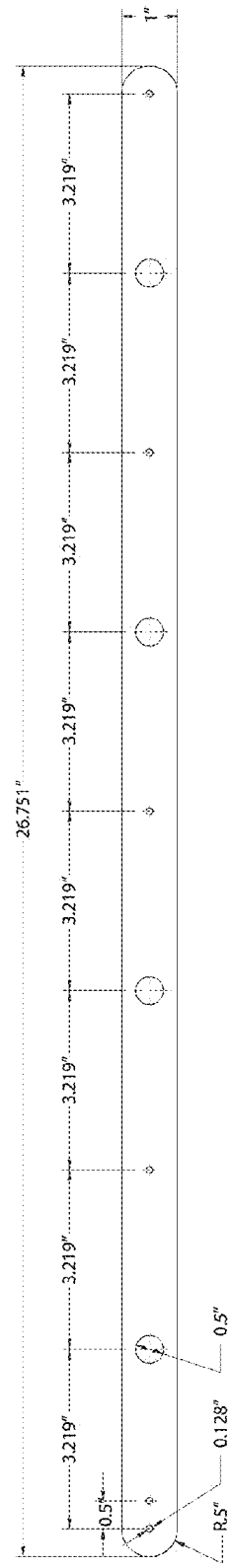

FIGS. 1-3 illustrate the various components of a frame (e.g., underlying frame) of a module of a modular living wall system, in accordance with various embodiments of the present invention. FIG. 1 illustrates an example top rail of a frame, FIG. 2 illustrates an example left rail and an example right rail of a frame, and FIG. 3 illustrates an example bottom rail and an example middle rail of a frame. In various embodiments, the top rail of FIG. 1 may be cut and formed from 0.063" aluminum and may be bent to the outer dimensions shown. In various embodiments, the left rail and right rail of FIG. 2 may have a same flat pattern that, when bent, are mirror images. The left rail and the right rail may be cut and formed from 16-ga aluminum (0.050"). In various embodiments, the bottom rail and middle rail of FIG. 3 may be cut and formed from 16-ga aluminum (0.050"). The bottom rail may be symmetric about central horizontal and vertical axes. The middle rail may be symmetric about a central vertical axis. The components of FIGS. 1-3 may include other materials, dimensions, or configurations in other embodiments. Once coupled, the rails may form a substantially rectangular underlying framework (e.g., 2 panel section of FIG. 7) for a module of a modular living wall system (e.g., modular living wall system of FIGS. 8-9).

Figures 4A, 4B:
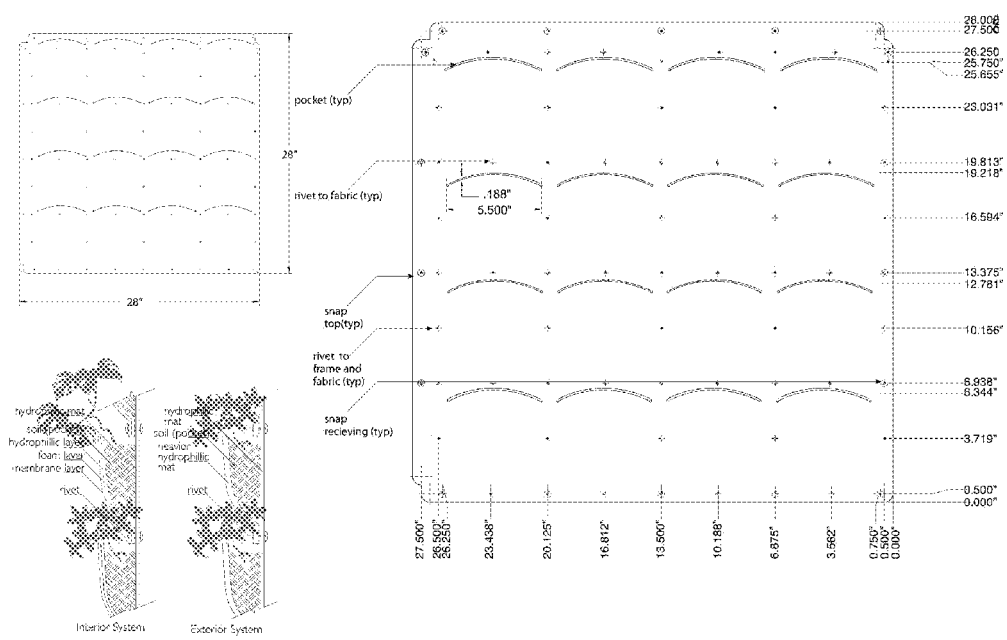
FIG. 4A illustrates a front view of an example fabric of a fabric arrangement configured to receive one or more plants and for mounting onto a frame of a module of a modular living wall system, in accordance with various embodiments of the present invention.
FIG. 4B depicts a cross-section diagram of the fabric arrangement for an example interior system and an example exterior system, in accordance with various embodiments.
Figure 5:
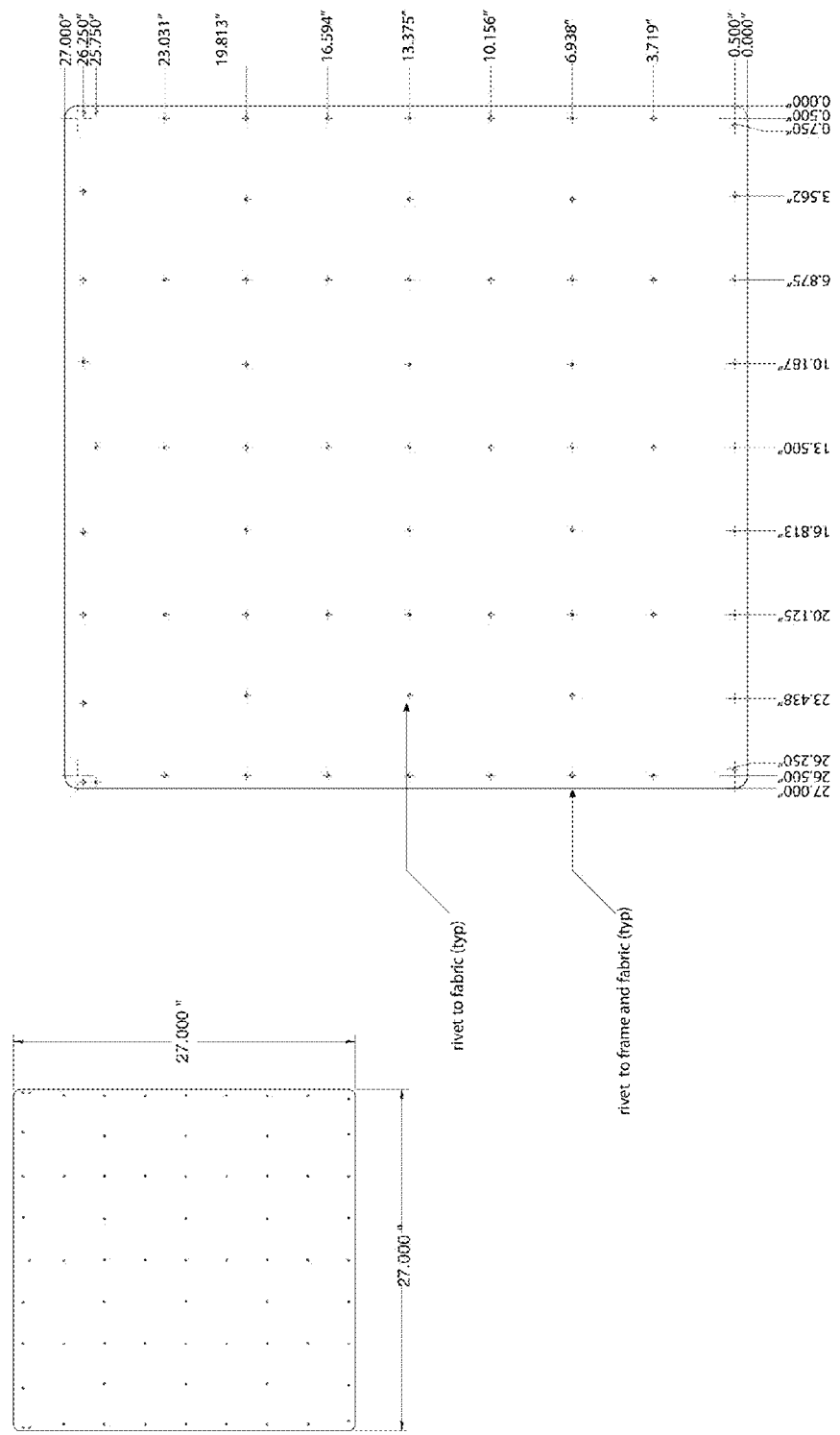
FIG. 5 illustrates a front view of an example fabric of a fabric arrangement configured to overlay another fabric such as, for example, the fabric illustrated in FIG. 4A, and for mounting onto a frame of a module of a modular living wall system, in accordance with various embodiments of the present invention.
Figure 6:
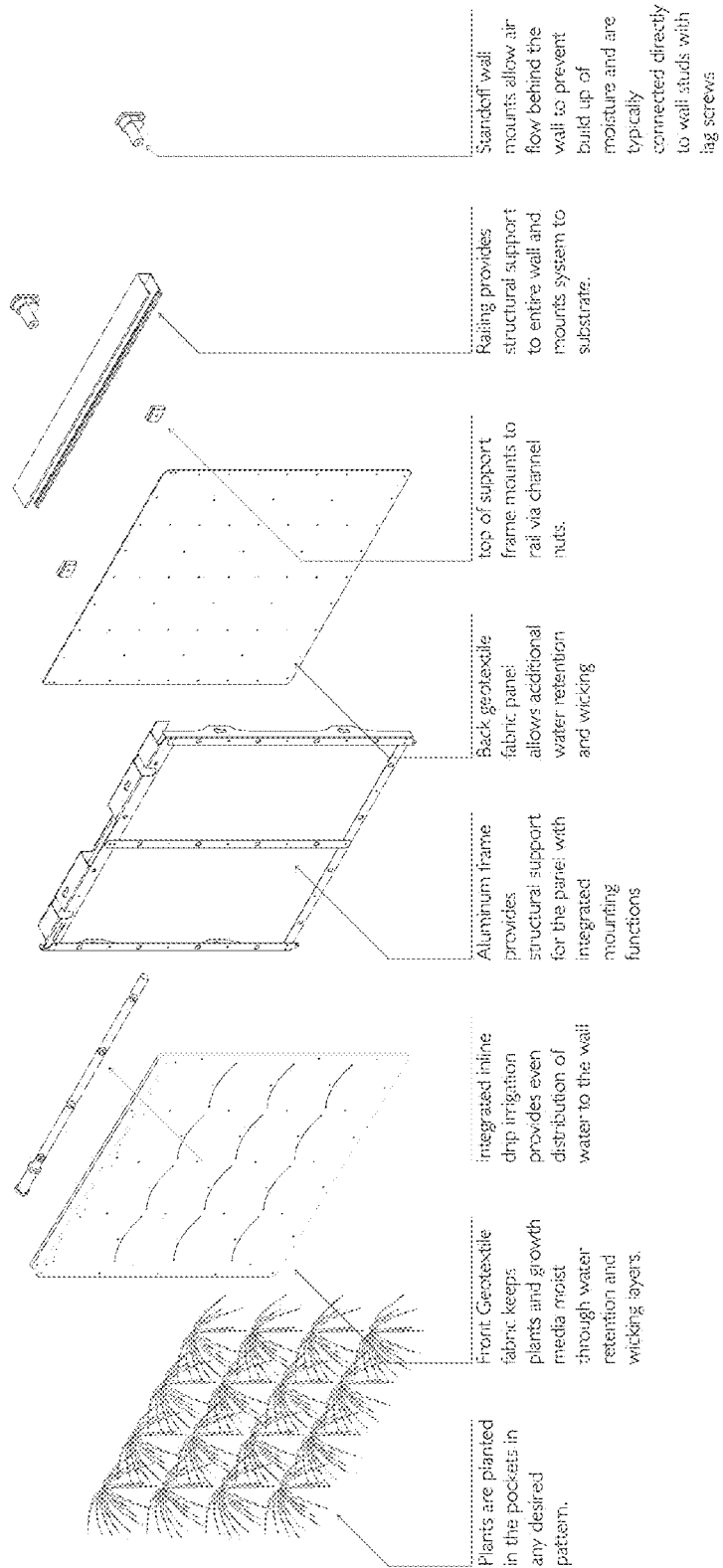
FIG. 6 illustrates an exploded axonometric view of the assembly arrangement of the module components described in FIGS. 1-5, in accordance with various embodiments of the present invention.

FIGS. 4A-B and 5 illustrate example fabrics for a fabric arrangement of a modular living wall system. FIG. 4A illustrates a front view of an example fabric of a fabric arrangement configured to receive one or more plants and for mounting onto a frame (e.g., underlying frame) of a module of a modular living wall system, while FIG. 5 illustrates a front view of an example fabric of a fabric arrangement configured to overlay another fabric such as, for example, the fabric illustrated in FIG. 4A, and for mounting onto a frame (e.g., underlying frame) of a module of a modular living wall system. FIG. 4B depicts a cross-section diagram of the fabric arrangement for an example interior system and an example exterior system, in accordance with various embodiments. FIG. 6 illustrates an exploded axonometric view of the assembly arrangement of the module components described in FIGS. 1-5, in accordance with various embodiments of the present invention. FIG. 6 may depict the underlying frame (e.g., aluminum frame) as it relates to the fabric arrangement and other components.

In various embodiments, holes of the example fabric of FIG. 4A may have a diameter of 0.128" (e.g., 0.125" diameter with a 0.003" tolerance), external corners may be rounded with a 0.5" radius, and pockets may have outer dimension of 5.5"×0.188" with a 3/32" rounded edge radius. In various embodiments, holes of the example fabric of FIG. 5 may have a diameter of 0.128" (e.g., 0.125" diameter with a 0.003" tolerance), external corners may be rounded with a 0.5" radius, and the holes may align with a front geotextile pattern from lower-right corner. The components of FIGS. 4A-B and FIG. 5 may include other materials, dimensions, or configurations in other embodiments.

Embodiments of the modular living wall system may be configured to be easily mounted and customized (in size and/or shape). Moreover, the modular design may be appropriate for indoor and outdoor applications. The modular living wall system may comprise an underlying frame and a fabric arrangement mounted onto the underlying frame and including a first fabric (e.g., fabric of FIG. 5) and a second fabric (e.g., fabric of FIG. 4A) overlaying the first fabric, wherein the first fabric is a hydrophilic mat, and wherein the second fabric includes at least one opening exposing the first fabric and configured to receive a plant. In various embodiments, the sturdy fabric system or arrangement may be configured to allow for plant roots to spread between separate openings. The separate openings may also allow for tailoring the soil mix to the individual plants. The fabric system may also be configured to reduce excessive wet and dry spots by providing a more uniform wetness across the structure.

In various embodiments, the edges of the first fabric and the second fabric may be coupled to the underlying frame using metal rivets or other suitable fastener. The edges of the first fabric may also be coupled to corresponding edges of the second fabric using metal rivets or other suitable fastener. In various embodiments, the body of the first fabric (i.e., the parts of the first fabric other than the edges) may be coupled to the body (i.e., the parts of the second fabric other than the edges) of the second fabric. A substantial portion of the bodies of the fabric may be uncoupled, allowing the roots of plants room to grow and expand across the module. The first fabric and/or the second fabric may be treated, formulated, or otherwise configured to reduce algae and microbial growth.

In some embodiments, the second fabric (e.g., front geotextile fabric) includes at least one opening exposing the first fabric (e.g., back geotextile fabric) and configured to receive a plant, as can be seen. The second fabric may be a hydrophilic mat. The second fabric may vary in make up dependent on a location of the modular living wall system. In embodiments where an interior system is used (e.g., indoors, see FIG. 4B), the second fabric may include a hydrophilic layer, an open cell foam layer overlaying the hydrophilic layer, and a perforated membrane overlaying the hydrophilic layer such that the open cell foam layer is between the hydrophilic layer and the perforated membrane. In embodiments where an exterior system is used (e.g., outdoors, see FIG. 4B), the second fabric may consist of a hydrophilic mat. The hydrophilic mat of the second fabric in an exterior system may be heavier than the hydrophilic mat of the first fabric. The hydrophilic mat of the second fabric in an exterior system may have a thickness that is greater than a thickness of the hydrophilic mat of the first fabric.

The second fabric may be arranged such that the hydrophilic layer abuts or is otherwise coupled in direct physical contact with the first fabric (e.g., at the rivet). The fabric arrangement may be mounted onto the frame by a plurality of rivets or other fasteners (e.g., snaps). The rivets may include a first type of rivets to the fabric only, which hold the first and second fabric of the fabric arrangement together and rivets to the frame and fabric, which hold the fabric arrangement together with the frame. The rivets may be configured (e.g., spaced) to allow roots of the plants to spread between separate openings in the second fabric. An edge of the first fabric may be coupled to an edge of the second fabric in some embodiments and edges of the first fabric and the second fabric may be coupled to the frame (e.g., using rivets or fasteners). In some embodiments, a body of the first fabric may be separate from a body of the second fabric (e.g., See FIG. 4B, the body of the first fabric may be separate from the body of the second fabric at the soil pockets that contain the plants and between the pockets to allow for the roots of the plants to not be constrained by the pockets).

Figure 7:
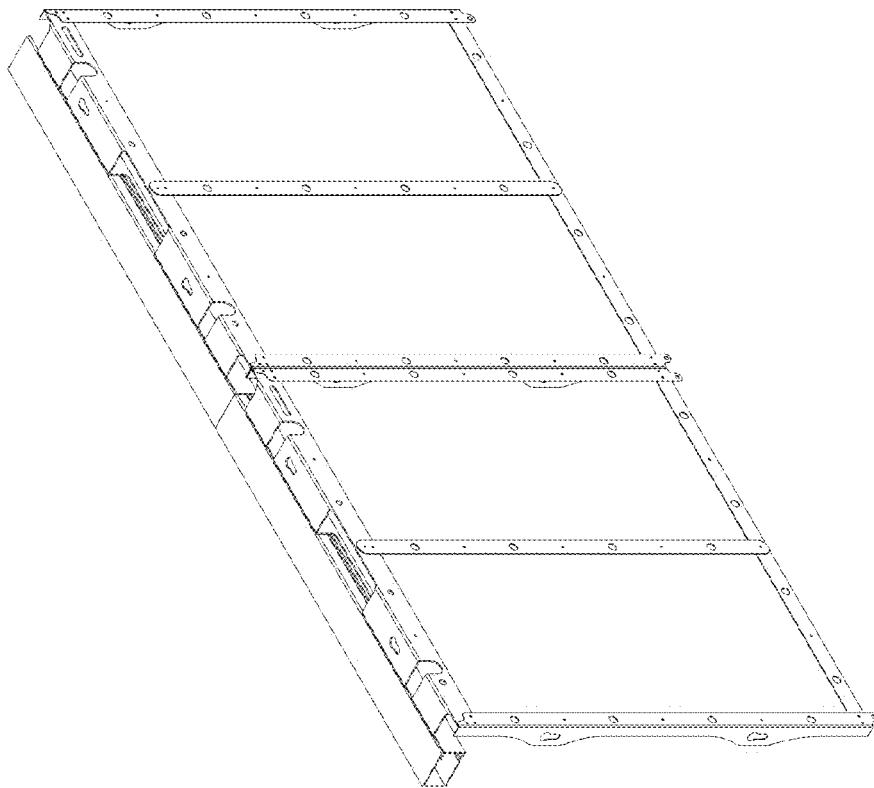
FIG. 7 illustrates a perspective view of a frame structure including a support rail, in accordance with various embodiments of the present invention.

FIG. 7 illustrates a perspective view of a frame structure (e.g., underlying frame referred to as "support frame" in FIG. 7) coupled with a support rail, in accordance with various embodiments of the present invention. The frame structure may include a plurality (e.g., four or more) rails coupled to each other to form a substantially rectangular shape, as can be seen. The depicted frame structure may correspond with two modules of a multi-module living wall system in some embodiments (e.g., each panel of the 2 panel section may correspond with one module).

Multiple modules can be coupled to each other to form a living wall system. In various embodiments, a first module (e.g., a first panel) and a second module (e.g., a second panel) may interlock such that the rail of the first module abuts the rail of the second module (e.g., as can be seen in the frame structure of FIG. 7). The living wall system may include additional modules similarly configured as the first module and the second module (e.g., to meet a customer's needs). In some embodiments, multiple modules may be connected to a support rail (e.g., a structural U-shaped aluminum rail as depicted) using, for example, channel nuts to facilitate securing of the modular living wall system to an existing building structure building in various configurations. See FIGS. 6-9.

Figure 8:
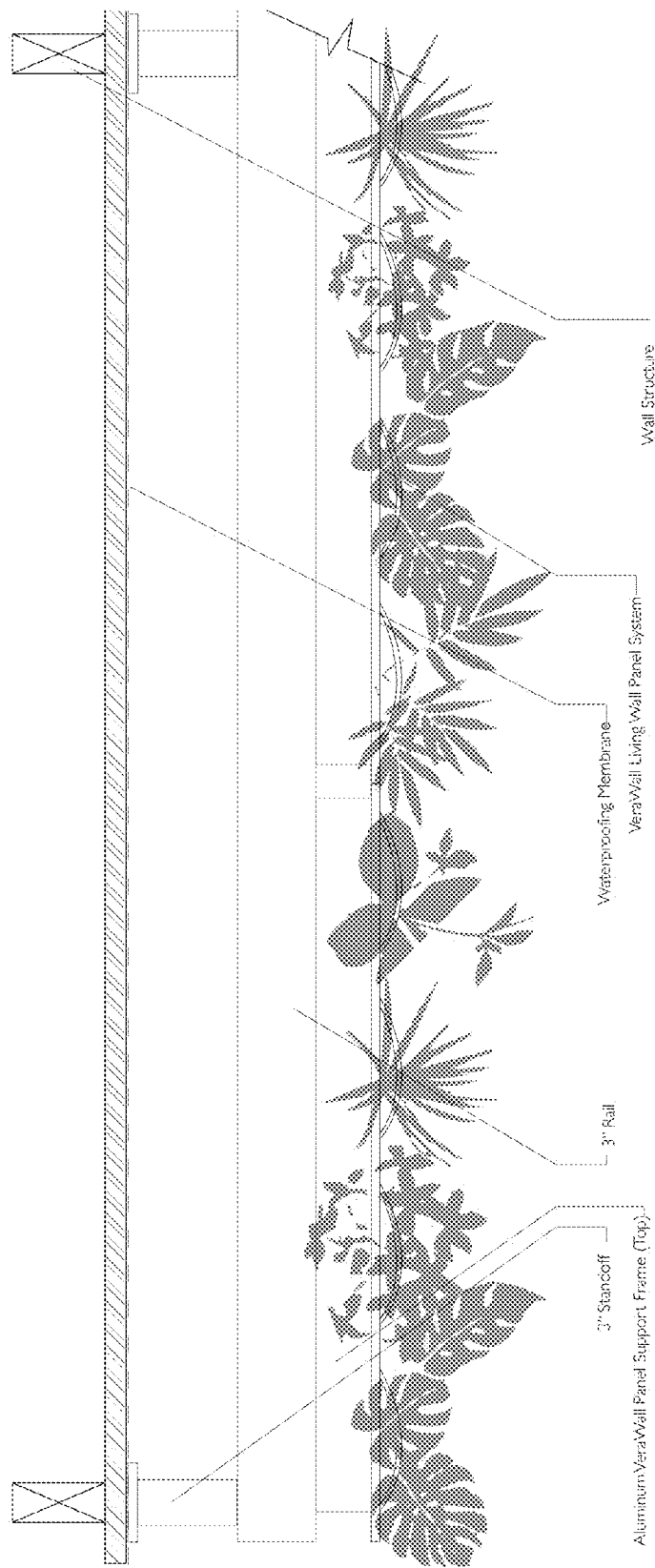
FIG. 8 illustrates a plan view of a modular living wall system integrated with an existing building structure, in accordance with various embodiments of the present invention.
Figure 9:
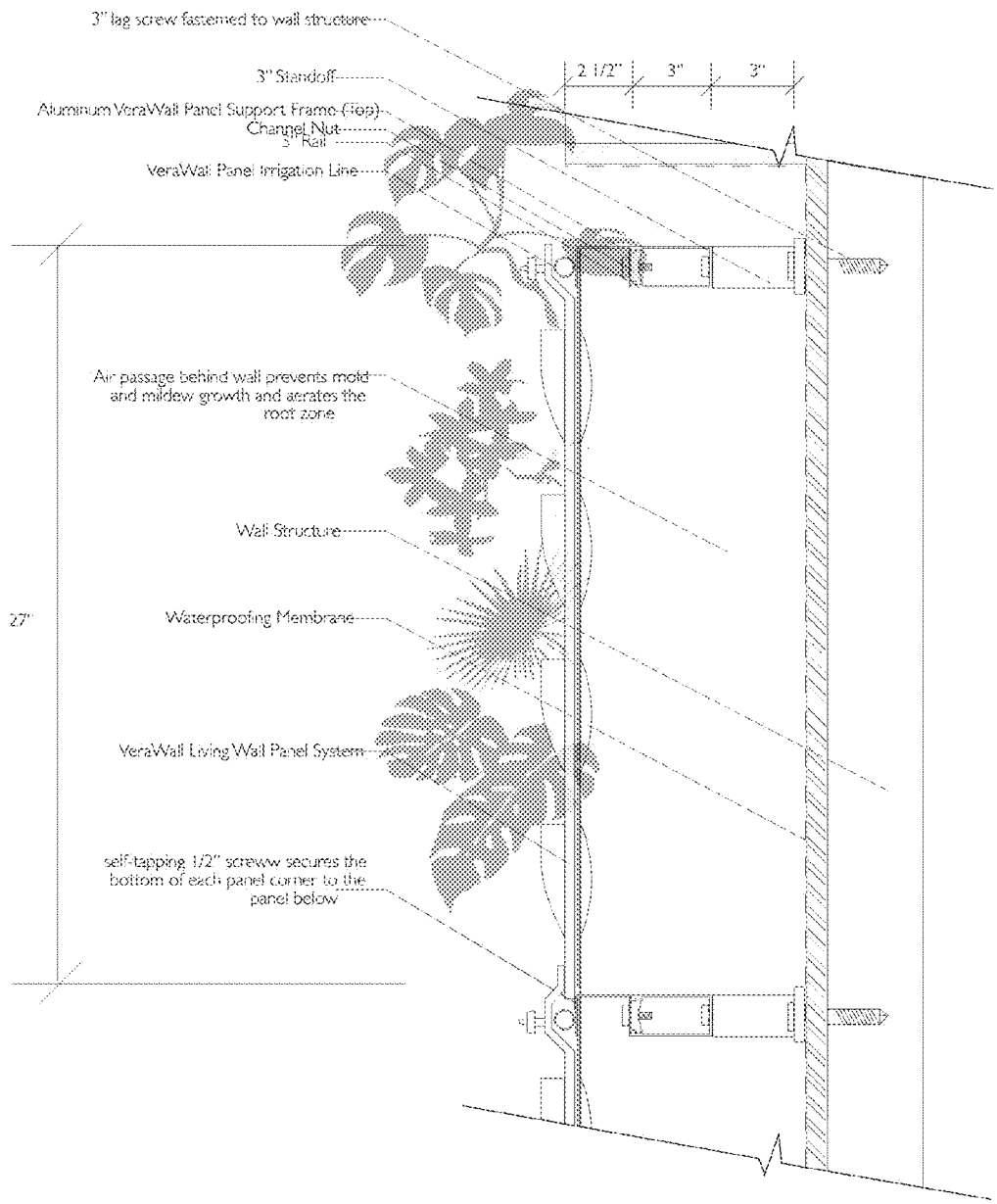
FIG. 9 illustrates a section view of a modular living wall system integrated with an existing building structure, in accordance with various embodiments of the present invention.

FIG. 8 illustrates a plan view of a modular living wall system integrated with an existing building structure, in accordance with various embodiments of the present invention. FIG. 9 illustrates a section view of a modular living wall system integrated with an existing building structure, in accordance with various embodiments of the present invention. It is noted that the attachment shown in FIG. 9 is for a wood frame. In other embodiments, other suitable attachment techniques may be used to couple the modular living wall system with an existing building structure.

According to various embodiments, the modular living wall system may include an irrigation system. The described embodiments may provide a modular structure that is substantially self-watering by an irrigation network. In various embodiments, the modular living wall system may be configured such that water that drips from the modular living wall system may be captured in a basin or the like and re-used by the irrigation system for watering the modular living wall system.

In various embodiments, individual modules of a system may include irrigation segments configured to couple to other irrigation segments of the other modules (e.g., integrated inline drip irrigation conduit of module in FIG. 6 may be coupled with another similarly configured integrated inline drip irrigation conduit of another module). The irrigation segment may be an integrated section of plastic tubing to convey water to the plants between the fabric arrangement. In various embodiments, the irrigation system may allow the fabric arrangement to be watered more evenly. For example, the irrigation system may be distributed in the living wall system so that manual watering is not required and/or so that bottom portions of the living wall system do not have to rely on water trickling down the wall system. The irrigation system may include a basin, drip pan, or the like, to capture water than drips from the bottom of the modular living wall system. The captured water may be re-used by the irrigation system for watering the modular living wall system. In various embodiments, the irrigation system may include a feed line fluidly coupled to the basin, drip pan, or the like, such that the captured water can be used for watering the living wall system. See FIGS. 10-15.

Figure 10:
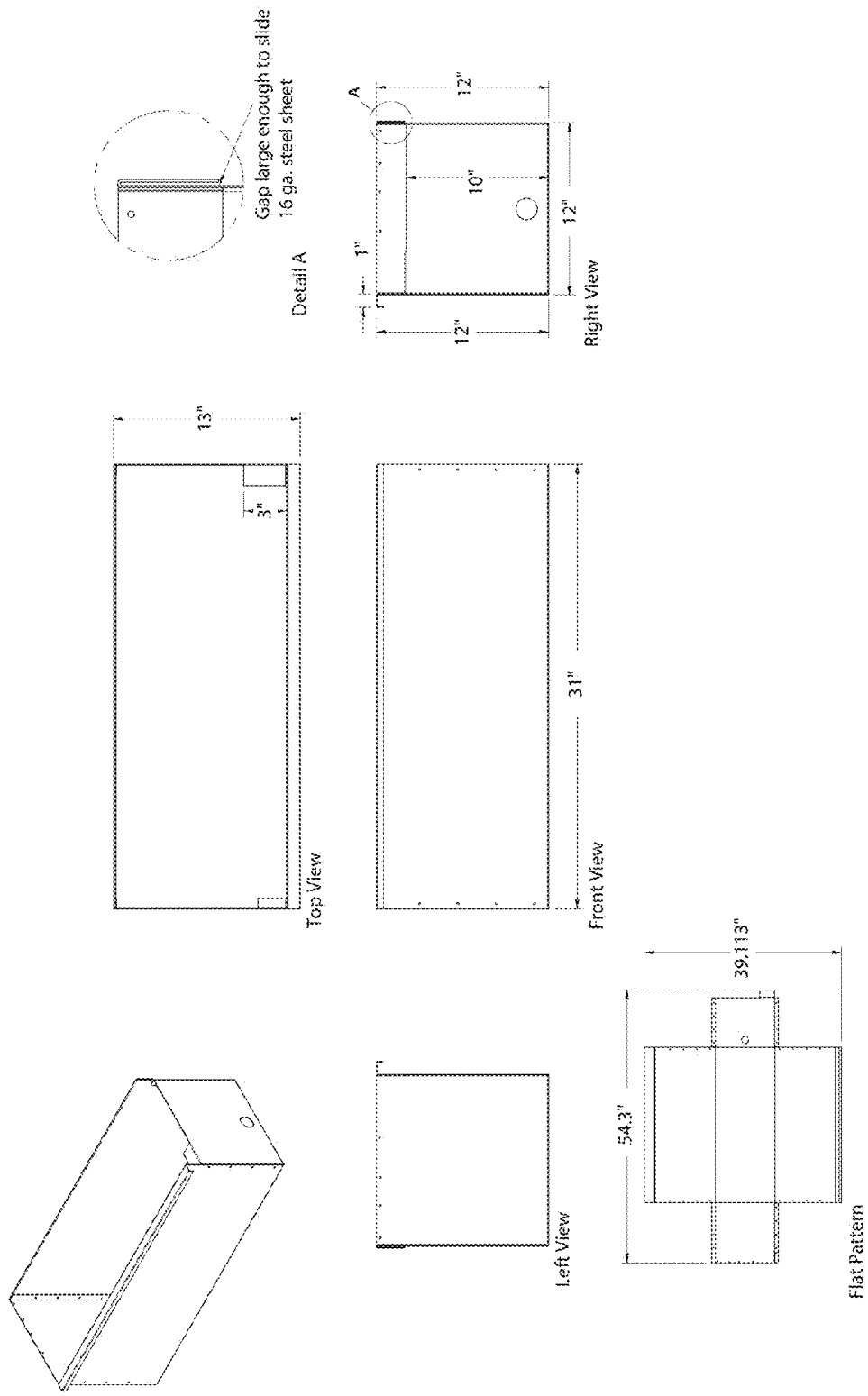
FIGS. 10-15 illustrate components of a basin assembly of the modular living wall module, in accordance with various embodiments of the present invention.
Figure 11:
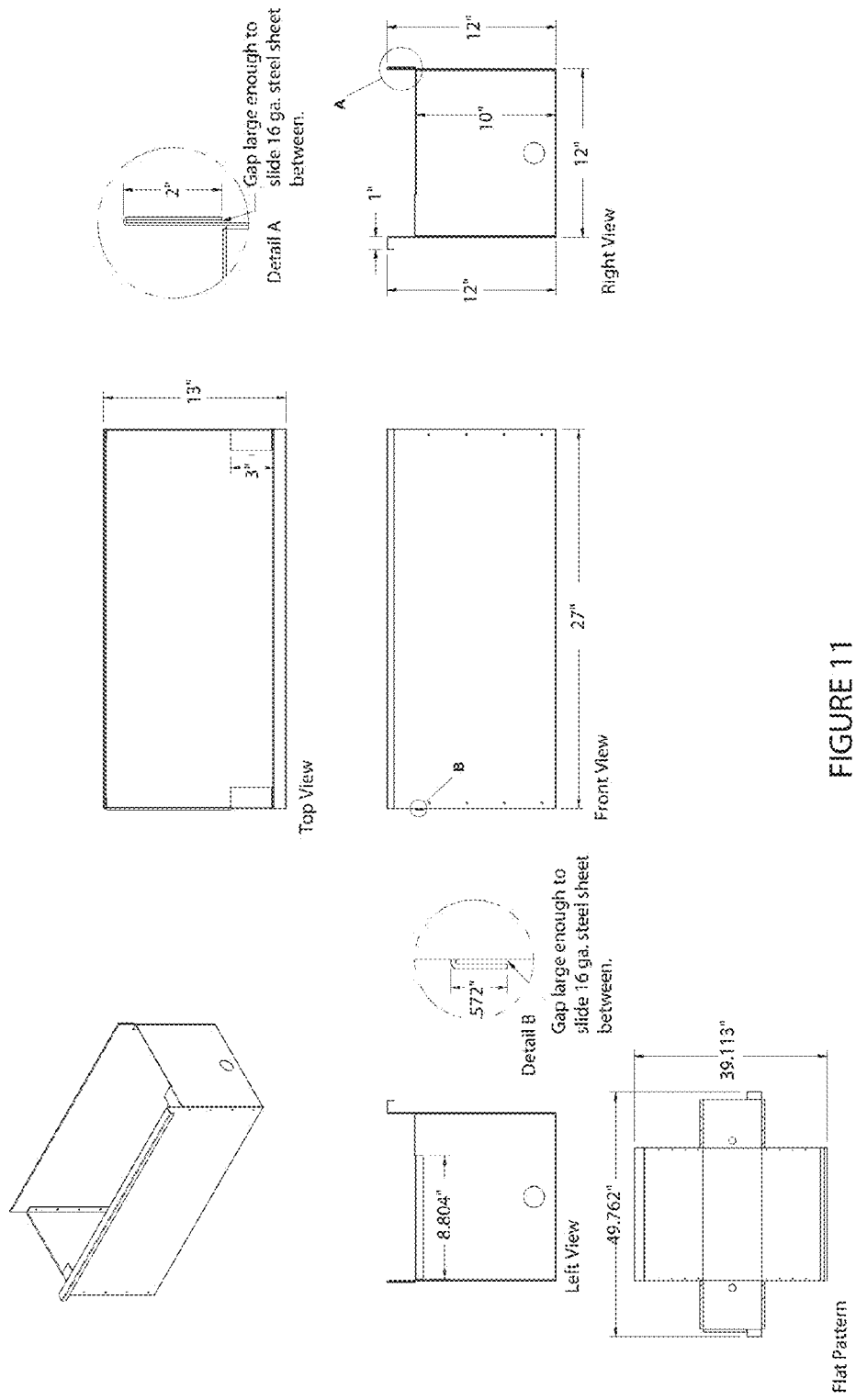
Figure 12:
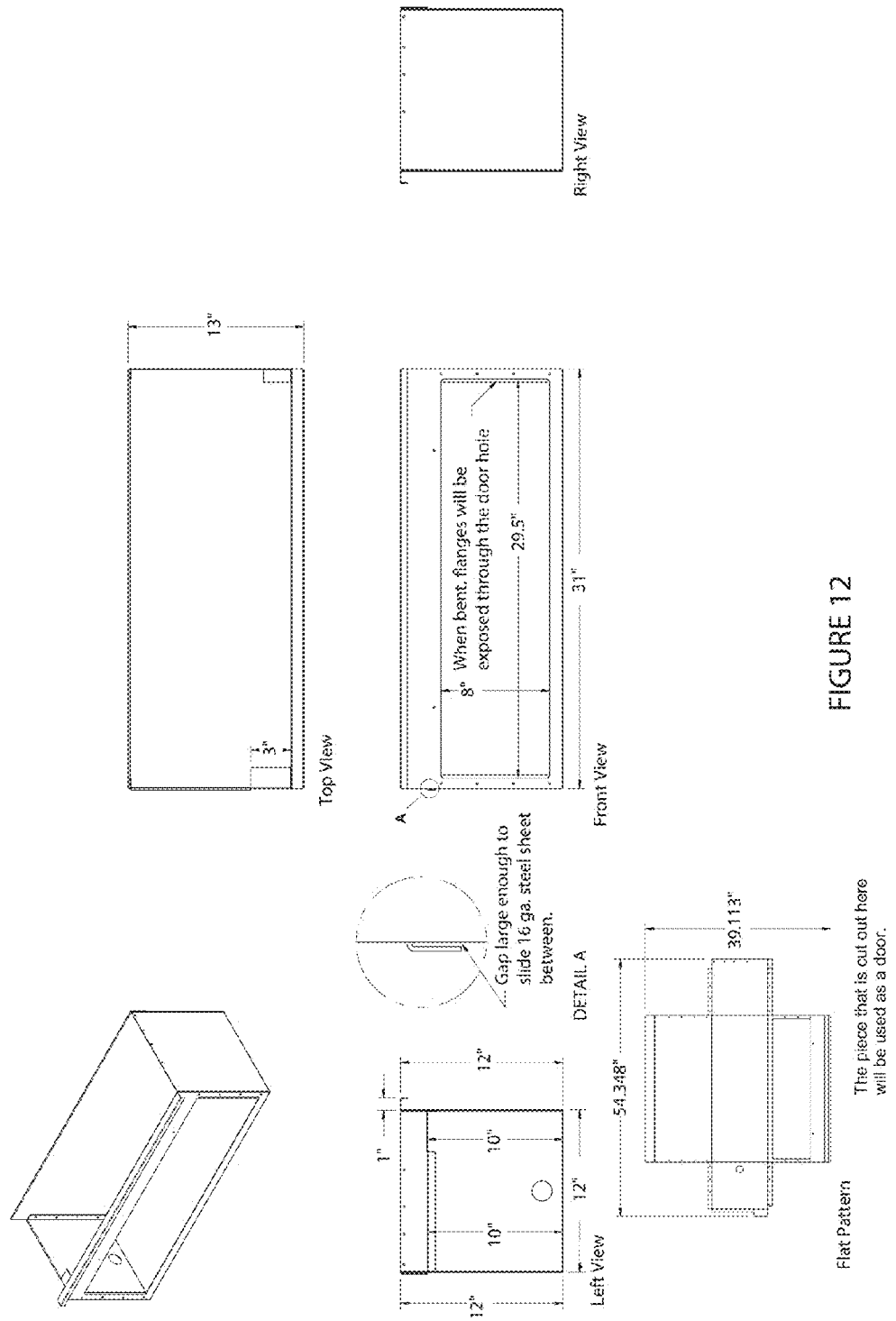
Figure 13:
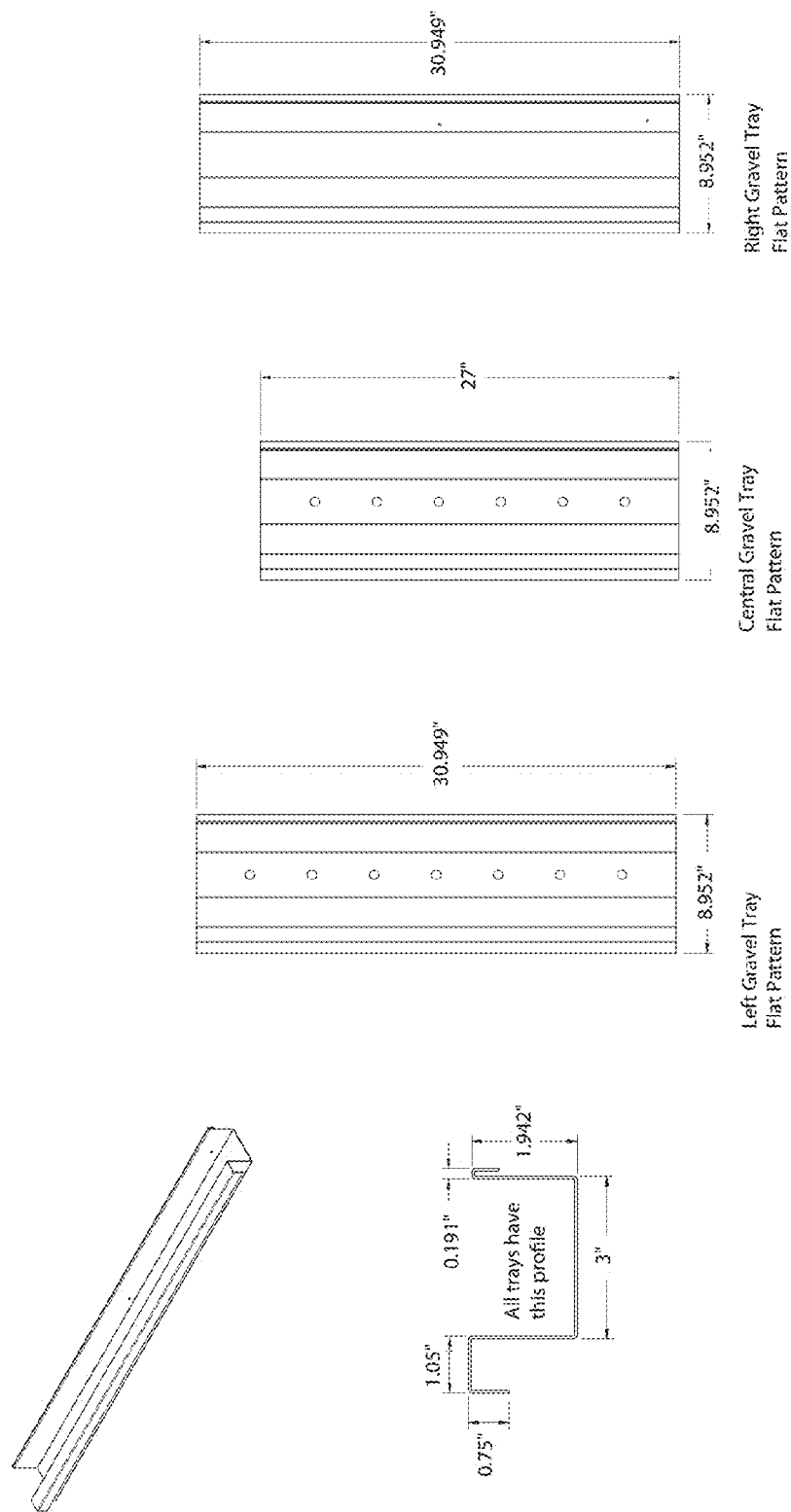
Figure 14:
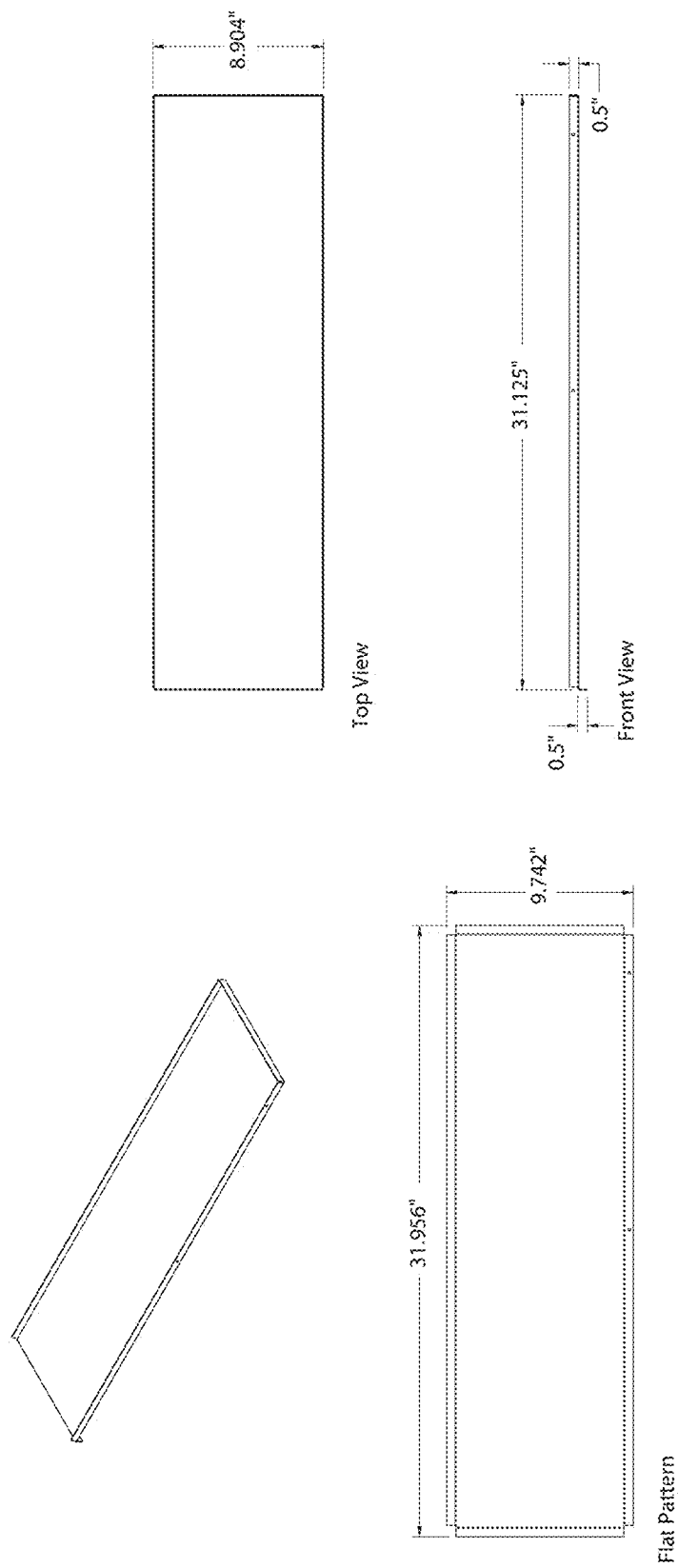
Figure 15:
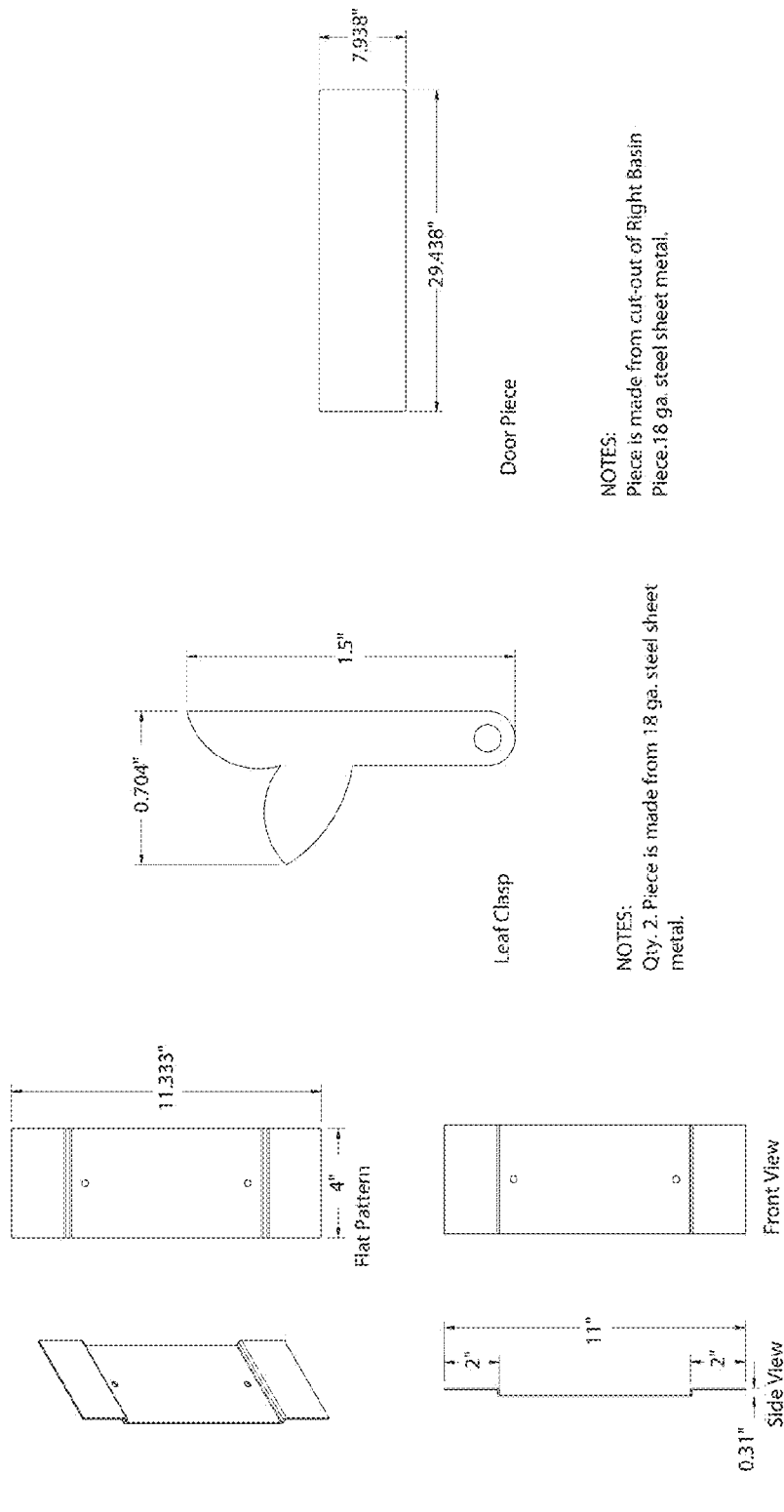

FIGS. 10-15 illustrate components of a basin assembly of the modular living wall module, in accordance with various embodiments of the present invention. The irrigation system may include components of the basin assembly described in connection with FIGS. 10-15 according to various embodiments. FIG. 10 illustrates a left piece of a basin assembly, FIG. 11 illustrates a center piece of a basin assembly, FIG. 12 illustrates a right piece of a basin assembly, FIG. 13 illustrates left, center, and right gravel trays of a basin assembly, FIG. 14 illustrates a waterproofing tray of a basin assembly, FIG. 15 illustrates a basin bracket, leaf clasp, and door of a basin assembly. In various embodiments, the components of FIGS. 10-15 may be made from 16-ga to 18-ga steel sheet metal. The left and center gravel trays of FIG. 13 may have thru-holes on a bottom portion. The components of FIGS. 10-15 may include other materials, dimensions, or configurations in other embodiments.

In various embodiments, the modular living wall system may include an external frame configured to mount about the periphery of one or more of the individual modules, or around a structure comprising multiple individual modules. In various embodiments, the external frame may function to hide the underlying frame components. In various embodiments, the external frame may function to add rigidity to the modular living wall system.

In various embodiments, multiple modules coupled together (e.g., a first module and a second module) may define a perimeter, and an exterior frame may be coupled to the coupled modules about the perimeter. In various embodiments, the external frame may function to hide the underlying frame components (the rails or the edges of the fabric arrangement, for example). In various embodiments, the external frame may function to add rigidity to the modular living wall system. See FIGS. 16-18.

Figure 16:
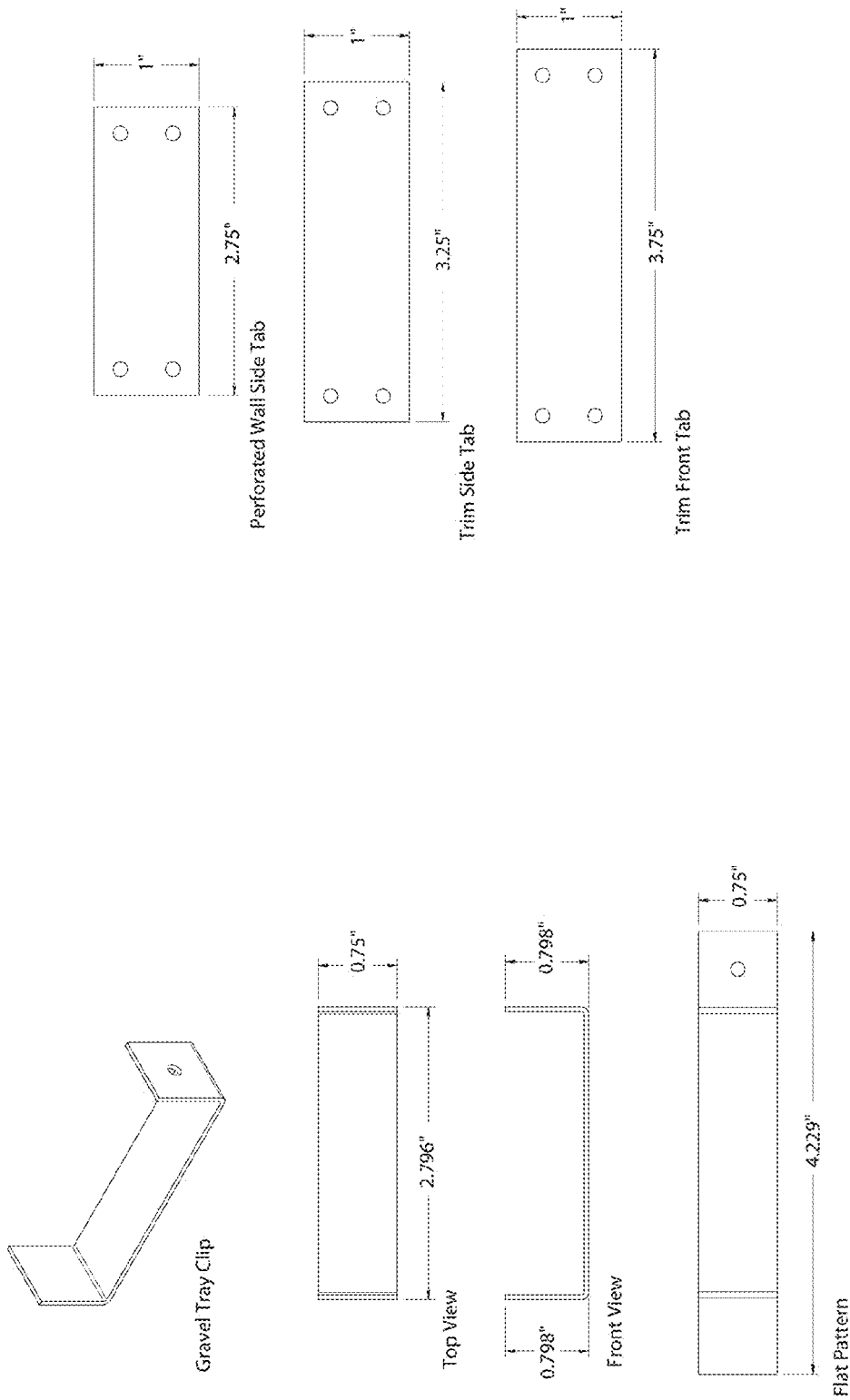
FIGS. 16-18 illustrate frame elements that enclose or finish the module components of the modular living wall system, in accordance with various embodiments of the present invention.
Figure 17:
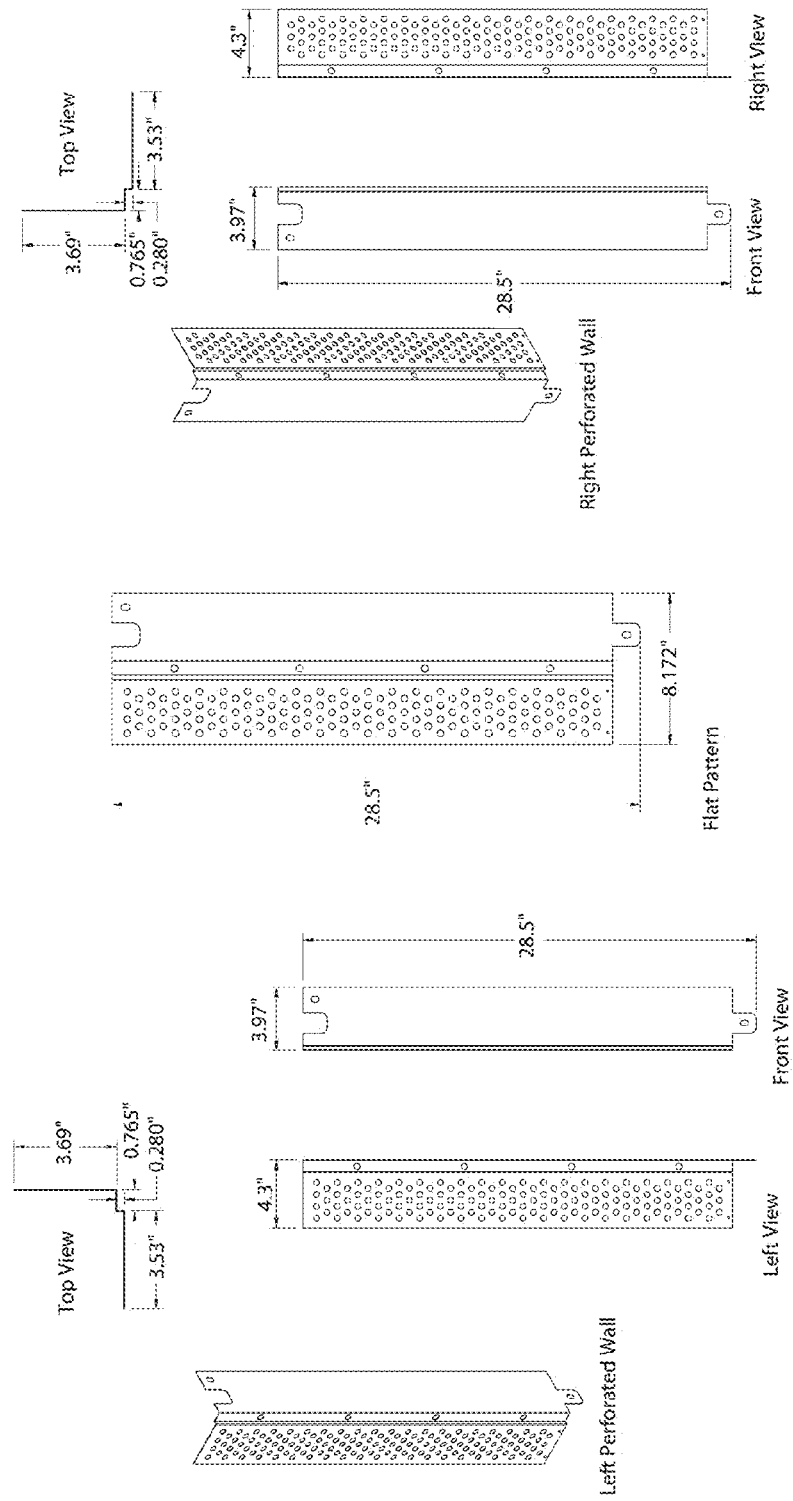
Figure 18:
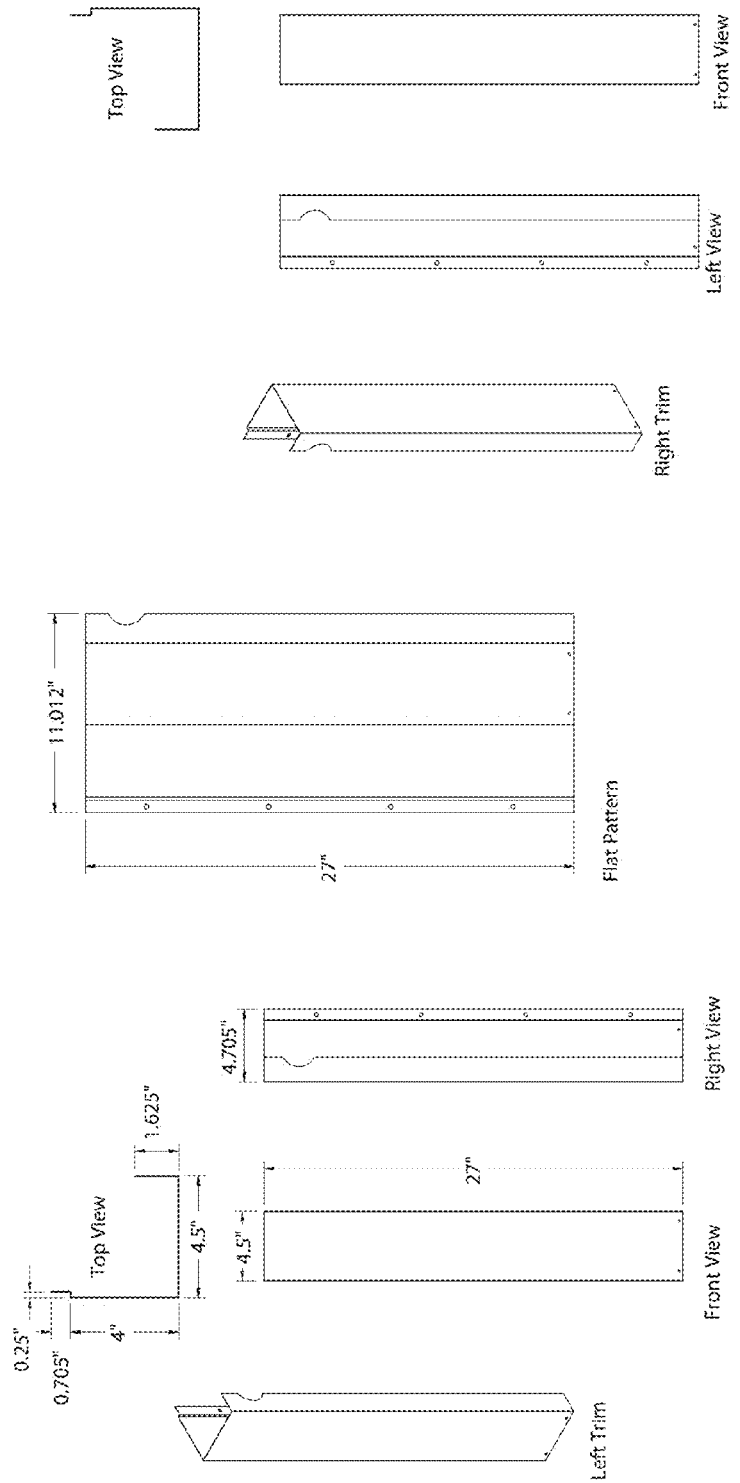

FIGS. 16-18 illustrate frame elements that enclose or finish the module components of the modular living wall system, in accordance with various embodiments of the present invention. FIG. 16 illustrates a perforated wall tab, trim side tab, and trim front tab, FIG. 17 illustrates left and right perforated walls, and FIG. 18 illustrates left and right trim pieces. In various embodiments, the components of FIGS. 16-18 may be made from 18-ga steel sheet metal. A flat pattern may be identical for the left and right gravel trays of FIG. 17 and for left and right trim pieces of FIG. 18. The components of FIGS. 16-18 may include other materials, dimensions, or configurations in other embodiments. Although the Figures may be depict scaling (e.g., ½"=1", ¼"=1", etc.) in connection with the described components, the components may have other dimensions than depicted in other embodiments.

Figure 19:
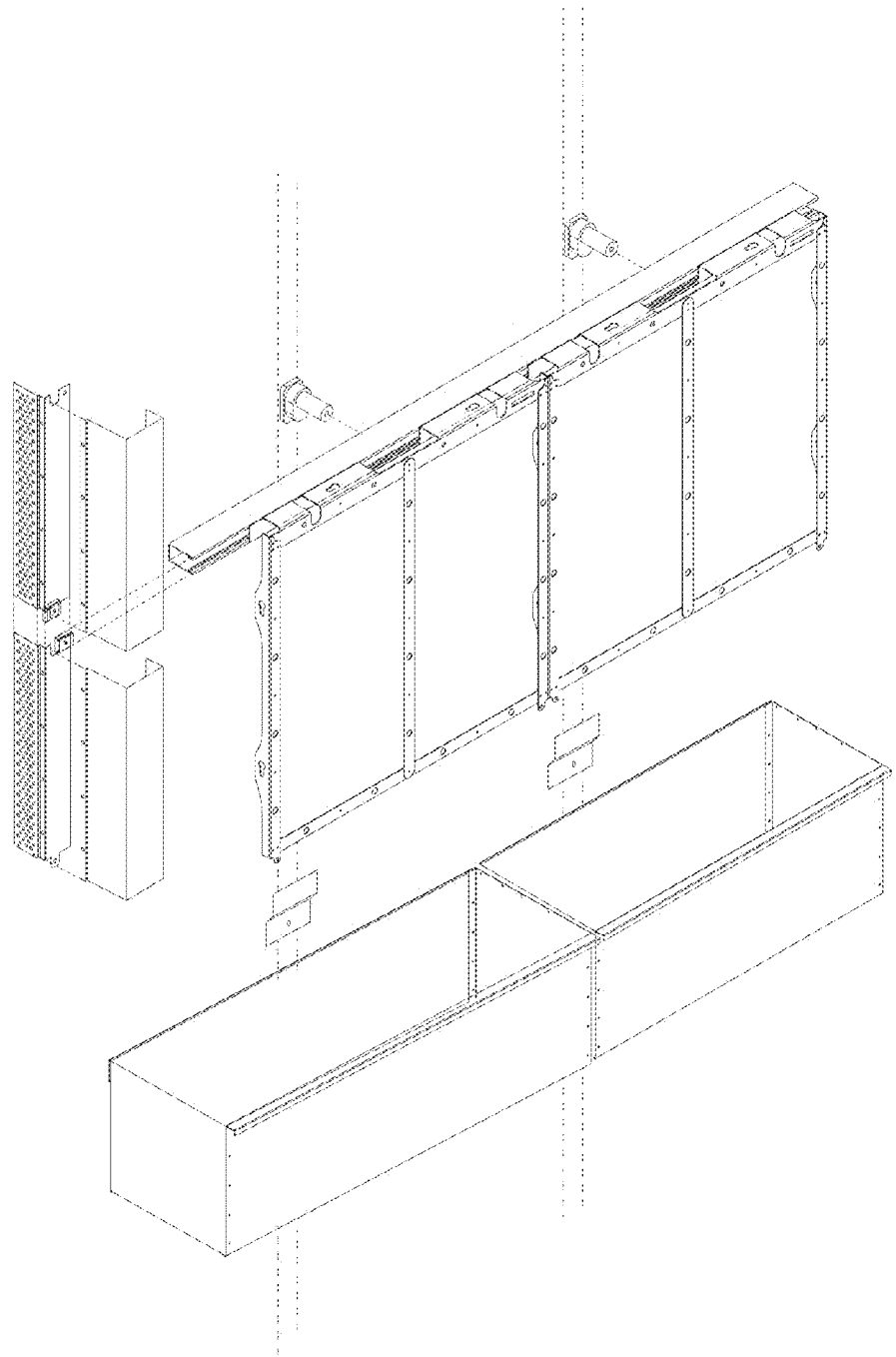
FIG. 19 illustrates a configuration for a metal support frame to rail with clip and basin, in accordance with various embodiments of the present invention.

FIG. 19 illustrates a configuration for a metal support frame to rail with clip and basin, in accordance with various embodiments of the present invention. Features of FIG. 19 may comport with other embodiments described herein. For example, the metal support frame may comport with embodiments described in connection with the underlying frame structure herein and the basin may comport with embodiments described in connection with a basin assembly described herein. Although the framework depicted in FIG. 19 is fastened together using rivets, in other embodiments joints may be coupled together using other suitable fasteners.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A module for a living wall system for growing plants, the module including:
   a frame including a plurality of rails, each rail coupled to another rail by their respective ends; and
   a fabric arrangement mounted onto the frame and including a first fabric and a second fabric overlaying the first fabric, wherein the first fabric is a hydrophilic mat, and wherein the second fabric includes at least one opening exposing the first fabric and configured to receive a plant, wherein the module is a first module and the first module is configured to couple to a second module such that a rail of the plurality of rails of the first module abuts a rail of a plurality of rails of the second module, and wherein a backside of the first fabric is exposed to air between the rails of the plurality of rails;
   wherein the second fabric comprises a hydrophilic layer, an open cell foam layer overlaying the hydrophilic layer, and a perforated membrane overlaying the hydrophilic layer such that the open cell foam layer is between the hydrophilic layer and the perforated membrane; and
   wherein the second fabric is arranged such that the hydrophilic layer abuts the first fabric.

2. The module of claim 1, wherein the fabric arrangement is mounted onto the frame by a plurality of rivets.

3. The module of claim 2, wherein the plurality of rivets are spaced to allow roots of the plants to spread between the at least one opening and other openings in the second fabric.

4. The module of claim 1, wherein the frame includes four rails coupled to each other to form a substantially rectangular shape.

5. The module of claim 1, wherein the rail of the first module is configured to be fastened to the rail of the second module using rivets.

6. The module of claim 1, wherein the first module includes an irrigation segment configured to couple to another irrigation segment of the second module.

7. The module of claim 1, wherein an edge of the first fabric is coupled to an edge of the second fabric, and wherein the edges of the first fabric and the second fabric are coupled to the frame.

8. The module of claim 7, wherein a body of the first fabric is separate from a body of the second fabric to provide room for roots of the plant to grow and expand between the at least one opening and other openings in each of the first module and the second module.

9. The module of claim 1, wherein a left rail and right rail of the plurality of rails of the first module have a same flat pattern that, when bent, are mirror images.

10. The module of claim 1, wherein the first module includes a side opening between the first and second fabrics, and wherein the frame is configured to align the side opening of the first module with the side opening of the second module to allow roots of the plant to travel from the first module to the second module through the respective side openings.

11. A living wall system for growing plants, the system including:
    a first module and a second module coupled to each other, each of the first and second modules including:
      an underlying frame including a plurality of rails, each rail coupled to another rail by their respective ends, and
      a fabric arrangement mounted onto the underlying frame and including a first fabric and a second fabric overlaying the first fabric, wherein the first fabric is a hydrophilic mat, wherein the second fabric includes at least one opening exposing the first fabric and configured to receive a plant and a side opening between the first and second fabrics and adjacent the at least one opening, and wherein the second fabric comprises a hydrophilic layer, an open cell foam layer overlaying the hydrophilic layer, and a perforated membrane overlaying the hydrophilic layer such that the open cell foam layer is between the hydrophilic layer and the perforated membrane; and
    an irrigation system including a first irrigation segment integrated into the first module and a second irrigation segment integrated into the second module, wherein the first irrigation segment and the second irrigation segment are coupled to each other and wherein the first module is coupled with the second module such that a rail of the plurality of rails of the first module abuts a rail of the plurality of rails of the second module and the side opening of the first module is aligned with the side opening of the second module to allow roots of the plant to travel from the first module to the second module through the respective side openings.

12. The system of claim 11, wherein the first module and the second module define a perimeter, and wherein the system further comprises an exterior frame overlaying the perimeter.

13. The system of claim 11, wherein the first module interlocks with the second module.

14. The system of claim 11, wherein a left rail and right rail of the plurality of rails of each of the first and second module have a same flat pattern that, when bent, are mirror images.

15. The system of claim 11, further comprising third or more modules that are each configured with an underlying frame and a fabric arrangement as the first and second modules, wherein the irrigation system further includes third or more irrigation segments corresponding with the third or more modules, the third or more irrigation segments being integrated into the third or more modules and coupled together with the first irrigation segment and the second irrigation segment.

16. The system of claim 11, wherein:
    the system is an exterior system; and
    the second fabric consists of a hydrophilic mat having a thickness that is greater than a thickness of the hydrophilic mat of the first fabric.

17. The system of claim 11, wherein the second fabric is arranged such that the hydrophilic layer abuts the first fabric.

18. The system of claim 11, wherein:
the at least one opening in the second fabric is one opening of a plurality of openings formed in the second fabric;
each opening of the plurality of openings is configured to receive one or more plants; and
a body of the first fabric is separate from a body of the second fabric to allow roots of the one or more plants room to grow and expand between separate opening of the plurality of openings in each of the first module and the second module.

19. The system of claim 11, wherein the first fabric and the second fabric are treated or formulated to reduce algae and microbial growth.

20. The system of claim 11, further comprising:
a support rail; and
one or more standoff wall mounts to couple the support rail to a building structure,
wherein the first and second modules are coupled to the support rail, and
wherein the one or more standoff wall mounts provide an air gap between the first and second modules and the building structure to allow air flow behind the first and second modules.

21. The system of claim 20, wherein at least a portion of a backside of the first fabric of the first and second modules is exposed to the air gap.

* * * * *